United States Patent [19]

Ransmark

[11] 4,243,526
[45] Jan. 6, 1981

[54] PROCESS FOR PURIFYING LIQUIDS AND A DEVICE FOR CARRYING OUT THE PROCESS

[76] Inventor: Sven-Erik L. Ransmark, 7 Askholmsgatan, 213 63 Malmö, Sweden

[21] Appl. No.: 12,405

[22] Filed: Feb. 15, 1979

Related U.S. Application Data

[63] Continuation of Ser. No. 882,535, Mar. 1, 1978, abandoned.

[51] Int. Cl.³ .............................................. C02F 1/12
[52] U.S. Cl. ....................................... 203/10; 203/49; 202/234; 210/177
[58] Field of Search ............ 203/49, 11, 10, DIG. 17; 202/234; 210/63 R, 71, 70, 68, 60, 177

[56] References Cited

U.S. PATENT DOCUMENTS

| 3,311,543 | 3/1967 | Loebel | 202/234 |
| 3,393,131 | 7/1968 | McIntyre, Jr. | 203/49 |
| 3,860,492 | 1/1975 | Lowi, Jr. et al. | 203/49 |
| 3,871,180 | 3/1975 | Swanson | 203/49 |

FOREIGN PATENT DOCUMENTS

| 1517363 | 10/1969 | Fed. Rep. of Germany | 203/49 |
| 7508377 | 7/1975 | Sweden | 203/49 |

Primary Examiner—Benoit Castel
Attorney, Agent, or Firm—William A. Drucker

[57] ABSTRACT

A process for purifying liquids comprises the steps of feeding the liquid to be purified into a sealed chamber and to guide the liquid in such a relation to a stream of air which is guided to circulate in a cycle in said chamber and is heated during part of its cycle, that the liquid will come into contact with the stream of air in a location where said stream of air has a raised temperature, bringing the damped air thus generated to condensate and discharging the resulting condensate from said chamber such as through a first line whereas the rest of the liquid is discharged separately through a second line.

The invention also refers to a plant or device, designed to carry out the process.

2 Claims, 1 Drawing Figure

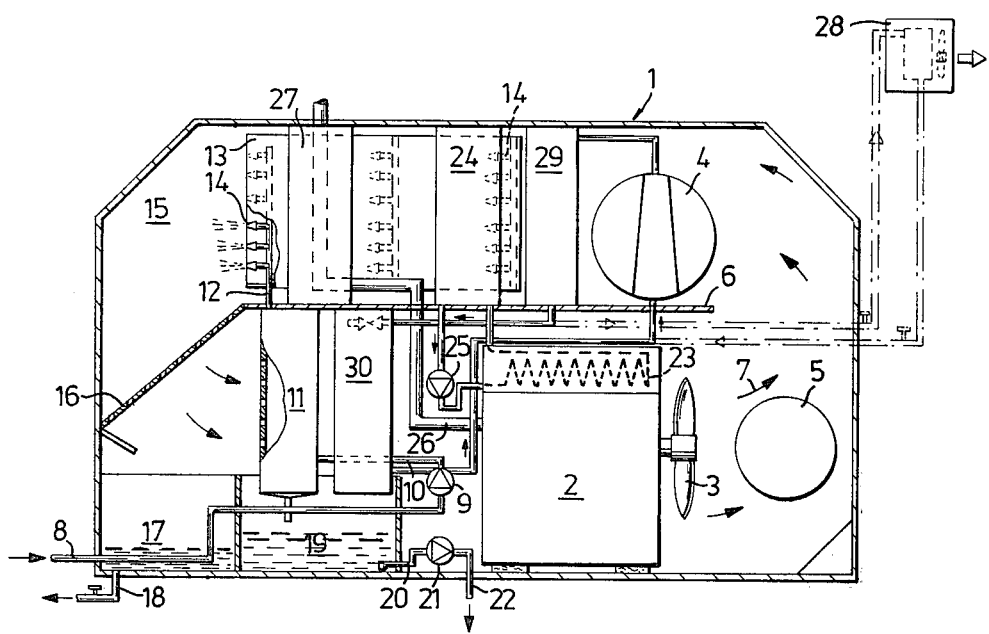

PROCESS FOR PURIFYING LIQUIDS AND A DEVICE FOR CARRYING OUT THE PROCESS

This is a continuation of Ser. No. 882,535 filed Mar. 1, 1978, now abandoned.

BACKGROUND OF THE INVENTION

Field of the Invention

This invention refers to a process for purifying a liquid, preferably water, separating out not desired constituents thereof.

Although the invention may thus be utilized in different types of purifying processes its primary object is for de-salting of sea water.

Two principal processes for de-salting of sea water are well known in the art.

One of these processes is a thermic process and the other one is a chemical process.

In the thermic process sea water is heated to a temperature above the boiling point thereof. Thereby, the water but not the salt will distill off. By cooling the steam or water vapor fresh water is obtained.

In a modified thermic process the moist contained in the air is separated. Said moist emanates from sea water which has evaporated from the sea.

The thermic processes are reliable but are very energy consuming.

The chemical processes are not so energy consuming but are on the other hand very expensive.

BRIEF SUMMARY OF THE INVENTION

The main object of the invention is to utilize the thermic principles in a new process and to provide an inexpensive plant which is easy to operate and has a modest energy consumption and further may be given small dimensions.

To accomplish this and other objects the invention has the characteristics of the claims.

BRIEF DESCRIPTION OF THE DRAWINGS

In the accompanying drawing an examplifying embodiment of the invention is illustrated and the drawing is a principal side view of a de-salting plant according to the invention.

DETAILED DESCRIPTION OF THE PREFERRED EMBODIMENT

The plant to be described is so designed that it is mainly suited for use in countries having sources of preferably fossil fuels, but it is understood that the invention is also suited for other demands, and preferably, it may be used to utilize waste energy, such as from a nuclear power plant. It may be seen that a plant need not include all the described components and also, further components may be added for other fields of uses. The invention may be used for all processes wherein thermal energy is transferred into mechanical or electrical energy, i.e. for example in steam power stations, gas turbine plants, nuclear power plants and so forth.

According to the invention it is only needed that the liquid to be purified is fed into a sealed container or chamber and is guided in such a manner in relation to a heated stream of air guided in a cycle in the chamber and heated during part of its cycle, that the liquid is sprayed to engage the stream of air in a part of the cycle thereof where the air is heated, and the obtained damped air is brought to condense and the resulting condensate is discharged from the chamber such as through a first line and the rest of the liquid is discharged e.g. through a second line.

In the illustrated embodiment of the invention reference numeral 1 designates a sealed chamber housing an internal combustion engine 2 which drives a fan 3 to direct an amount of air fed into the chamber in a cycle according to the arrows 7. Said motor also drives a compressor 4 for a cooling assembly and further drives an electric generator 5. By means of a partition wall structure 6 and by the design of the chamber walls the air is directed as illustrated by the arrows.

The water to be de-salted is fed through a line 8 into the plant and more precisely to a pump 9 that via a line 10 pumps this water through a cooling element 11 that may have a grid structure in a manner known per se such that the stream of air 7 may pass through said cooling element. The water is pressed from said cooling element into a ramp 13 through a line 12 and leaves said ramp in the shape of a spray through a plurality of nozzles 14 provided in the ramp.

In the illustrated embodiment the motor 2 is a combustion engine or another motor which develops a considerable amount of heat in operation. The circulating air will therefore be heated when it passes the engine 2. When said heated air in the space 15 hits the spray of salt water from the nozzles 14 the air will take up and evaporate part of said salt water. As a result thereof the temperature of the air falls in relation to the heat which is necessary to generate the steam. By means of the fan 3 the damped air is further transported and it first reaches a drip-catcher 16 separating the non-evaporated salt water (the salt concentration of which of course is somewhat raised) so that it may reach a collecting vessel 17 from which it is discharged from the plant through a line 18. Thereafter the flow of air passes through the cooling element 11. As a result of the cooling action provided hereby, a condensation takes place and the obtained condensate, i.e. fresh water, flows into a container 19, and then reaches a pump 21 via a line 20 and said pump feeds the water to the storage or consumption location through a line 22. The operation is then repeated as long as the plant operates. It is understood that the pumps 9,21 as well as the rest of the power consuming components of the plant are suitably driven by the engine 2.

However, the described plant may be made even more effective by steps to be described.

The engine may, in a manner known per se, be provided with a water jacket 23 and a cooler 24 and a pump 25, that pumps the water in a sealed system between the water jacket 23 and the cooler 24. Further, the exhaust from the engine may be passed to an exhaust cooler 27 through an exhaust pipe 26 before said exhaust gases are discharged from the chamber. By taking this step, the heat from the engine is utilized in the best manner possible.

By utilizing the heat that a cooling plant 28 trasports the plant may give an even higher effect. The compressor 4 of the cooling plant may be placed inside or outside the chamber. However, the condensor 29 is located in the chamber 1. The generated cooling amount may be used for any cooling needs, such as for air conditioning in cold-stores and deep-freezing stores. In case the need for cooling is not continous or constant, it is possible to provide a cooling element 30 in the chamber 1 and thereby utilize the over-capacity of the compressor.

What I claim is:

1. A process for purifying a liquid, preferably water, comprising the steps of:
   (a) providing a sealed chamber,
   (b) providing a source of heat and motive power within said chamber,
   (c) forcing air under control of said source over said source to heat said air,
   (d) providing a cooling chamber and cooling said cooling chamber under control of said source,
   (e) guiding said liquid through said cooling chamber to cool same,
   (f) spraying said cooled liquid in a spraying area in said sealed chamber,
   (g) passing said heated air through said spraying area to collect liquid, and
   (h) passing said thusly damped air through said cooling chamber to condense out said collected and purified liquid.

2. A system for purifying a liquid, preferably water, which comprises:
   (a) a sealed chamber,
   (b) motive and heat means positioned in said chamber for providing motive power and heat,
   (c) forcing means responsive to said motive and heat means for forcing air in said chamber over said motive and heat means to heat said air,
   (d) a cooling chamber in said sealed chamber,
   (e) means controlled by said motive and heat means to cool said cooling chamber,
   (f) feed means entering said sealed chamber and passing through said cooling chamber for passing said liquid through said cooling chamber to cool said liquid,
   (g) a spray area in said sealed chamber,
   (h) spraying means in said spray area, coupled to said feed means for spraying said cooled liquid in said spray area, said forcing means forcing said heated air through said spray chamber, whereby said air collects liquid in said spray chamber,
   (i) conduit means directing said thusly damped air from said spray chamber to said cooling chamber wherein said collected liquid is condensed, and
   (j) outlet means for removing collected and purified liquid.

* * * * *